United States Patent [19]

Birchak et al.

[11] Patent Number: 5,510,582
[45] Date of Patent: Apr. 23, 1996

[54] ACOUSTIC ATTENUATOR, WELL LOGGING APPARATUS AND METHOD OF WELL LOGGING

[75] Inventors: James R. Birchak, Spring, Tex.;
Alexander Lifson, Manliys, N.Y.;
Eugene J. Linyaev, Houston, Tex.;
John W. Minear, Houston, Tex.;
Dennis E. Roessler, Houston, Tex.;
David J. Young, Houston, Tex.

[73] Assignee: Halliburton Company, Houston, Tex.

[21] Appl. No.: 398,979

[22] Filed: Mar. 6, 1995

[51] Int. Cl.⁶ .................................... G01V 1/40
[52] U.S. Cl. .................. 181/102; 181/106; 367/25; 367/911
[58] Field of Search ................ 181/102, 108, 181/104, 106; 367/25, 911

[56] References Cited

U.S. PATENT DOCUMENTS

| | | | |
|---|---|---|---|
| 3,191,143 | 6/1965 | Pardue | 181/104 |
| 3,381,267 | 4/1968 | Cubberly, Jr. et al. | 367/189 |
| 3,493,921 | 2/1970 | Johns | 367/86 |
| 4,858,718 | 8/1989 | Chelminski | 181/106 |
| 5,036,945 | 8/1991 | Hoyle et al. | 181/104 |
| 5,171,943 | 12/1992 | Balogh et al. | 181/102 |
| 5,229,553 | 7/1993 | Lester et al. | 181/102 |

FOREIGN PATENT DOCUMENTS

0375549A2  12/1989  European Pat. Off. .

OTHER PUBLICATIONS

*Incompressible Flow*, Chapter 11 "Flows that are Exact Solutions of the Navier–Stokes Equations", Ronald L. Panton, Wiley–Interscience Publication (pp. 262–302).

Primary Examiner—Ian J. Lobo
Attorney, Agent, or Firm—Gilbreth & Adler; J. M. Gilbreth

[57] ABSTRACT

Disclosed is a sonic well tool for performing acoustic investigations of subsurface geological formations penetrated by a borehole. The well tool generally includes a longitudinally extending body for positioning in said borehole. The tool also includes a transmitter supported by the body for transmitting acoustic energy, and a receiver supported by the body for receiving acoustic energy. Finally, the tool includes an acoustic attenuation section positioned on the body between the transmitter and the receiver. This section includes one or more cavities defined by the body, inertial mass members positioned inside the cavities in a suitable manner to form a gap between the wall of the cavity and the inertial mass members, and an acoustical attenuation fluid in the gap. The method for attenuating sonic waves generally includes transmitting a sonic wave from the transmitter to the tool, passing the sonic wave through the acoustic attenuation section, and receiving attenuated wave at the receivers.

24 Claims, 8 Drawing Sheets

ACOUSTIC ATTENUATOR, WELL LOGGING APPARATUS AND METHOD OF WELL LOGGING

BACKGROUND OF THE INVENTION

1. Field of the Invention

The present invention relates to an acoustic attenuator, to an apparatus for well logging and to a method of logging a well. In another aspect, the present invention relates to an acoustic attenuator, an acoustic well tool apparatus having such an attenuator, and to a method of performing acoustic investigations in a well with such a well tool. In still yet another aspect, the present invention relates to an acoustic attenuator for attenuating sonic waves travelling along a well tool, to an acoustic well tool apparatus having attenuation of the sonic waves travelling along the well tool, and to a method of attenuating acoustic signals using such a well tool.

2. Description of the Related Art

Hydrocarbon exploration and data gathering continues even after the drilling of a well, generally by utilizing wireline logs that are obtained to reveal certain physical characteristics of the formation. The formation porosity and water saturation may be derived by measuring formation resistivity, neutron and gamma ray values.

Formation porosity may also be obtained by taking sonic logs utilizing a sonic well logging tool. Sonic logs are also taken to obtain the speed of propagation of sound in the rock, and to obtain information on the bulk elastic properties of the formation.

Such information that may be obtained from sonic logs is useful in a variety of applications, including well to well correlation, determining porosity, determining the mechanical or elastic parameters of the rock and hence an indication of lithology, detecting overpressured formation zones, and enabling the conversion of a seismic time trace to a depth trace from information acquired on the speed of sound in the formations.

In addition to being able to obtain resistivity, neutron and gamma ray investigations using wireline tools, oilfield technology developed in the late 1980's produced alternatives to wireline logs, mainly, the resistivity, the neutron and the gamma ray density measurements can now be performed on the drill string while drilling, i.e. "measuring while drilling" or "MWD".

However, similar developments of a "while drilling" alternative to the fourth most commonly used log, the sonic log, has not been as successful as with the "while drilling" alternative for taking resistivity, neutron and the gamma ray density logs.

With a sonic log, an acoustic signal is generated at a transmitting transducer, which signal propagates through the formation to at least one receiving transducer and the time of first signal arrival is detected. As the time of transmission is known, and the time of the first arrival of acoustic energy at the receiver after having passed through the formation is measured, the time of propagation of the signal through the formation which is referred to as interval transit time $\Delta t$ can now be calculated. This interval transit time may then be used in the Wyllie time-average equation, $\Delta t = \Delta t_{solid}(1-\phi) + \Delta t_{fluid}(\phi)$, to obtain porosity $\phi$. $\Delta t_{solid}$ and $\Delta t_{fluid}$ are known from predetermined knowledge of the speed of propagation of sound in various rocks and fluids and by knowing the types of rock and fluid in which the investigation is being made. As an alternative to the Wyllie time average relationship, the more recent "Raymer, Hunt, Gardner" relationship may also be utilized.

While it is desired that signals generated by the sonic tool transmitter travel to the sonic tool receiver via the formation, it is also possible for such signals to travel from the transmitter to the receiver via the tool body itself. It is desirable that the detected signal be virtually free of energy launched by the transmitter into the tool body which is then propagated along the tool body to the position of the receiver.

The velocity of sound through liquids of the type typically found in a well bore is on the order of 5,000 feet per second. On the other hand, the velocity of sound through earth formations is in the range of about 5,000 to about 25,000 feet per second. By way of comparison, metals can have sonic propagation velocities ranging between 13,000 and 20,000 feet per second.

Since the speed of propagation of sound in the tool body, which is normally steel, can in some instances be much higher than that of the formation rock, the tool signal arrival in those cases invariably occurs before the formation arrival. As a sonic tool merely records signals as they are obtained, the tool has no way of distinguishing whether a signal has traversed the formation or the tool body. Thus, such a first arriving signal traversing the tool body may be confused as the first arriving signal traversing the formation.

Fortunately, various techniques have been developed in the wireline logging industry for attenuating and/or slowing down the tool propagated signal so that formation arrival may be detected without much interference from the tool propagated signal. In such wireline investigations, the tool is not required to function as a load bearing member so that it has been possible to form an array of staggered openings through the width of the sidewall of the tool's housing. These openings serve to lengthen the total path length that a housing propagated acoustic signal must follow so that the signal across an extremely broad range of frequencies is not only delayed in its transit of the array of holes, but is also attenuated as a result of the increased path length and the signal scattering caused by the openings.

U.S. Pat. No. 3,381,267, issued Apr. 30, 1968 to Cubberly, Jr. et al. discloses a well logging tool having a rigid housing with a large number of reversed paths and interface surfaces to provide an extremely tortuous path for attenuation of sonic energy that would otherwise travel longitudinally along the housing between the transmitter and receiver.

U.S. Pat. No. 3,493,921, issued Feb. 3, 1970, to Johns discloses a sonic well logging tool which utilizes between the transmitter and receiver, a configuration of collapsed bellows, which configuration is stated as achieving desired characteristics as to structural integrity, sonic delay and sonic attenuation.

U.S. Pat. No. 5,036,945, issued Aug. 6, 1991, to Hoyle et al. discloses a sonic well tool having a first and second attenuation and delay apparatus for attenuating and delaying the signal traversing the tool body. The first attenuation and delay apparatus includes interleaved rubber and metal like washers for attenuating compressional and flexural waves propagating along the body, and further includes a bellows section having a corrugated shape and a thin traverse dimension. The second attenuation and delay apparatus includes mass loading rings surrounding the housing of the well tool, and also includes a bellows section having a corrugated shape and a thin traverse dimension.

U.S. Pat. No. 5,229,553, issued Jul. 20, 1993 to Lester et al. discloses an acoustic isolator for use with a well logging tool having transducers in a first and third tool segment, which are to be acoustically isolated from receivers in a second and fourth tool segment. The acoustic isolator consists of vertebrate links composed of spools, encased by resilient boots, which spools are arranged end-to-end in tandem configuration. A plurality of split shells interconnect the spools by externally gripping the boots covering the end portions of the respective adjacent spools.

The expedient of providing openings or cuts that extend through the side wall thickness of the sonic well tool is clearly unsatisfactory for a sonic investigation performed from a drilling string or drill collar. In the measuring while drilling ("MWD") environment, the sonic tool is incorporated into the drill collar and must be able to withstand the immense forces and accelerations encountered during the drilling of the well. Large numbers of perforations through the side wall of the drill collar would weaken the collar so that it would no longer be able to withstand normal wear and tear of drilling. Additionally, the fluid isolation between the inside of the drill collar and its exterior would be lost.

Openings or cuts extending through only a fraction of the width of the drill collar have not been thought to be effective since the remaining portion of the drill collar has previously been thought to provide a "straight through" path for the unattenuated propagation of the acoustic signal.

Additionally, the prior art expedient of "convoluting" the sidewall of the sonic tool so that the tool has a uniformly thick, yet tortuous longitudinal cross-section is equally unsatisfactory in that such shapes either are too weak or require too large a portion of the limited diameter of the tool.

E.P. No. 0 375 549, published Jun. 27, 1990 discloses a method and apparatus for performing acoustic investigations in a borehole. The sonic tool includes a plurality of axially periodic, substantially circumferentially continuous sections of the drill collar (such as grooves or ridges in the form of circumferential rings or helical threads) with acoustic propagation characteristics different from the drill collar to attenuate and delay signals traversing the sonic tool. E. P. No. 0 375 549 also discloses "portions" formed in the surface of the drill collar at random locations, which may be filled with epoxy, fiberglass or some other material having significant resistance to the abrasion expected through contact with the borehole wall during the drilling process. While E. P. No. 0 375 549 does provide for some attenuation of the signals traversing the sonic tool body, greater attenuation is still desired.

While these prior art inventions attempt to address the problem of sound waves traversing the sonic tool, they each either suffer from one or more limitations and/or do not provide the desired level of attenuation.

Therefore, a need exists in the art for an improved sonic well logging tool.

There is another need in the art for an improved attenuation apparatus.

There is even another need in the art for an improved method of sonic well logging.

There is still another need in the art for an improved well logging tool in which sonic signals traversing the body of the sonic well tool do not cause undue interference with the desired sonic signals traversing the formation.

There is yet another need in art for a method of sonic well logging in which sonic signals traversing the body are attenuated sufficiently so that they do not cause undue interference with the desired sonic signals traversing the formation.

There is even yet another need in the art for an improved acoustic logging while drilling ("AWD") tool.

There is still yet another need in the art for an improved method of performing acoustic logging while drilling.

These and other needs in the art will become evident to those of skill in the art upon review of this application.

SUMMARY OF THE INVENTION

According to an object of the present invention there is provided an improved sonic well logging tool.

According to another object of the present invention there is provided an improved attenuation apparatus.

According to even another object of the present invention there is provided an improved method of sonic well logging.

According to still another object of the present invention there is provided an improved well logging tool in which sonic signals traversing the body of the sonic well tool do not cause undue interference with the desired sonic signals traversing the formation.

According to yet another object of the present invention there is provided a method of sonic well logging in which sonic signals traversing the body are attenuated sufficiently so that they do not cause undue interference with the desired sonic signals traversing the formation.

According to even yet another object of the present invention there is provided an improved acoustic logging while drilling ("AWD") tool.

According to still yet another object of the present invention there is provided an improved method of performing acoustic logging while drilling.

These and other objects will become evident to those of skill in the art upon review of this application.

According to one embodiment of the present invention there is provided an apparatus for sonic well logging having at least one transmitter and at least one receiver. Positioned between the transmitter and the receiver is an acoustical attenuation section suitable to attenuate sonic waves traversing the sonic well tool. This acoustical attenuation section generally includes one or more cavities in the sonic well tool, into which are inserted inertial masses. The cavities are generally shaped to receive the attenuators and are slightly larger so that a gap will exists between the walls of the cavities and the inertial masses as the attenuator is positioned in the cavity. Residing in the gap is an attenuation fluid. An o-ring seal on the attenuator keeps the fluid within the cavity. A locking cap member serves to keep the attenuator positioned within the cavity.

According to another embodiment of the present invention there is provided an apparatus for attenuating sonic waves. The apparatus generally includes a body into which are positioned one or more cavities. These cavities are generally shaped to receive the attenuators and are slightly larger so that a gap will exists between the walls of the cavities and the inertial masses as the attenuator is positioned in the cavity. Residing in the gap is an attenuation fluid.

According to even another embodiment of the present invention there is provided a method for attenuating sonic waves travelling along a sonic well tool having a longitudinally extending body, a transmitter supported on the body, and a receiver supported on the body. The method for attenuating sonic waves travelling along a sonic well tool generally includes transmitting a sonic signal from the transmitter to the well tool body. Next, the method includes transmitting the sonic signal through an attenuation section on the well tool body, wherein the section comprises one or more cavities defined by the body, inertial mass members positioned inside the cavities in a suitable manner to form a gap between the wall of the cavity and the inertial mass members, and an acoustical attenuation fluid in the gap. Finally, the method includes receiving the attenuated signal at the receiver.

BRIEF DESCRIPTION OF THE DRAWINGS

FIGS. 10A–D are a schematic representation of the mathematical model utilized in the Example. FIG. 10A shows the inertial mass 500 at rest surrounded by acoustical attenuation fluid 501 confined by a tool 505 and locking cap 508. FIG. 10B shows that sound energy has moved the tool 505 upward but the inertial mass 500 lags because the viscous action of the fluid 501 permits slippage, which slippage results in slower fluid motion by the inertial mass than by the tool. FIG. 10C shows that as sound drives the tool 505 downward, the inertial mass can continue to slip upward while the tool 505 moves downward, which can shear the acoustical attenuation fluid upward at the inertial mass and downward at the tool 505 wall. FIG. 10D shows the tool returned to rest after a sound excitation, with the inertial mass 500 returning to rest later.

DETAILED DESCRIPTION OF THE INVENTION

In order to better understand the operating context of the present invention, reference will first be made to drilling operations in general.

Figure 1:
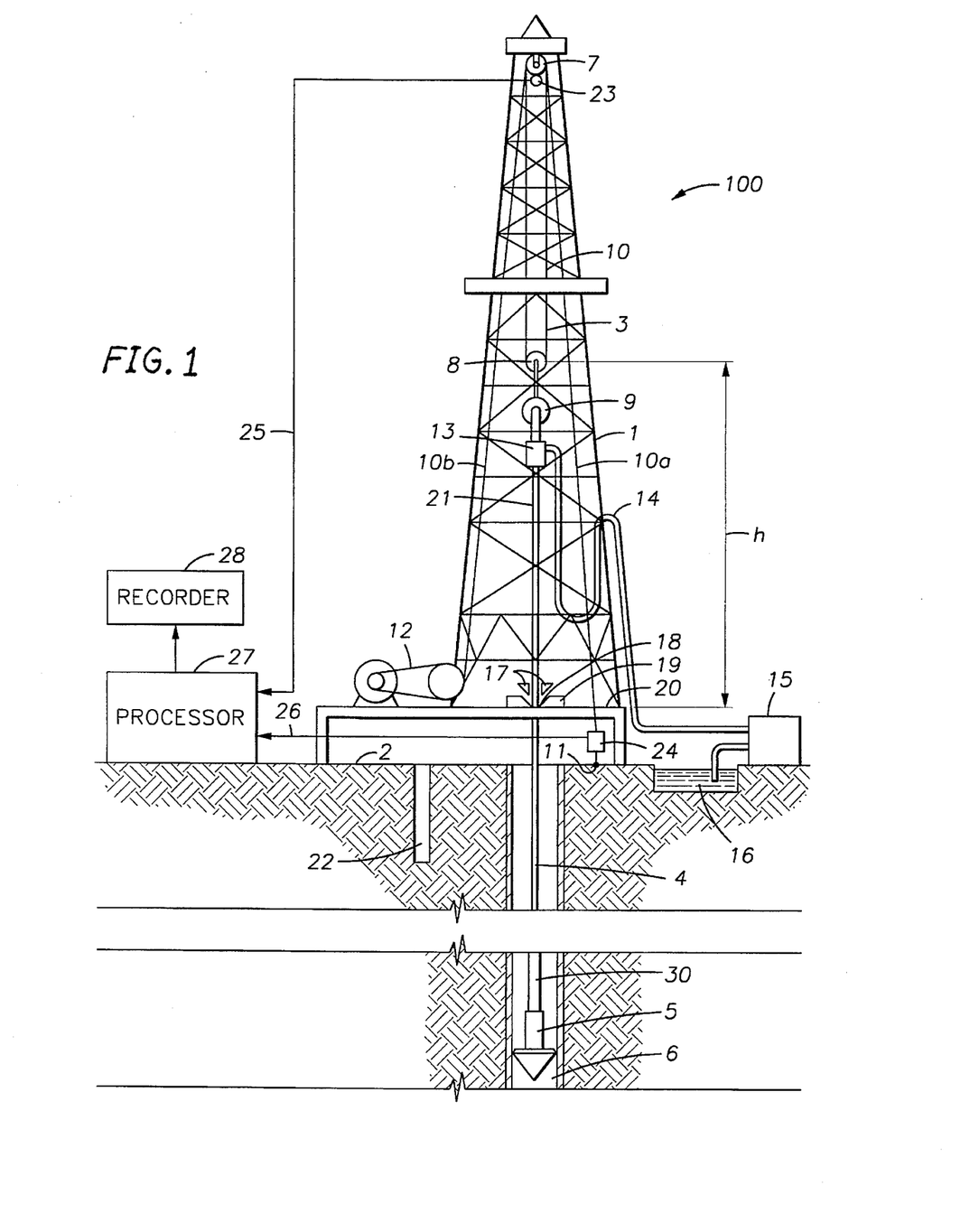
FIG. 1 is a schematic illustration of a typical well operation showing a drilling rig 100 and a drill string 4 with a downhole acoustic logging tool 30.

Referring now to FIG. 1 there is shown a general illustration of a drilling operation showing a drilling rig 100 and a drill string 4 with a downhole acoustic logging tool 30 positioned in well 6. It is to be understood that FIG. 1 and the discussion concerning FIG. 1 are generic to a drilling operation in general, and are taken from EP 0 375 549 A2.

Of course, it is also to be understood that the acoustic tool of the present invention will be utilized as tool 30 of FIG. 1.

In FIG. 1, the rotary drilling rig 100 shown generally, includes mast 1 rising above ground 2 which is fitted with lifting gear 3 from which is suspended a drill string 4 formed of drill pipes screwed one to another and having at its lower end a drill bit 5 for the purpose of drilling a well 6. The lifting gear 3 consists of a crown block 7, the axis of which is fixed to the top of the mast 1, a vertically travelling block 8, to which is attached to hook 9, a cable 10 passing round blocks 7 and 8 and forming, from crown block 7, a dead line 10a anchored to a fixed point 11 and also forming an active line 10b which winds around the drum of winch 12.

Drill string 4 is suspended from hook 9 by means of a swivel 13 linked by hose 14 to a mud pump 15, which permits the injection of drilling mud into well 6, via the hollow pipes of the drill string 4. Drilling mud may be drawn from a mud pit 16 which may be fed with surplus mud from the well 6. The drill string may be elevated by turning the lifting gear 3 with winch 12 and the drill pipes may be successively removed from (or added to) the well 6 and unscrewed in order to remove bit 5. These drill pipe raising and lowering operations require the drill string 4 to be temporarily unhooked from the lifting gear 3; the former is then supported by blocking it with wedges 17 in a conical recess 18 in the rotating table 19 mounted on platform 20 through which the drill string passes. The lowermost portion of the drill string may contain one or more tools, as shown at 30 for investigating downhole drilling conditions or for investigating the properties of the geological formations penetrated by the bit and the borehole 6. Specifically with respect to the present invention, the acoustic logging tool of the present invention will be utilized as tool 30.

During drilling operations, the drill string 4 is driven in a rotary motion by means of a kelly 21 fitted to its upper end. Between such periods the kelly is stored in a pipe sleeve 22 in the ground.

Variations in the height h of the travelling block 8 during these drill string 4 raising operations are measured by means of sensor 23 which may be an angle of rotation sensor coupled to the faster pulley of crown block 7. The weight F applied to hook 9 of the travelling block 8 may also be measured by means of a strain gauge 24 inserted into dead line 10a of cable 10 to measure its tension. Sensors 23 and 24 are connected by lines 25 and 26 to a processing unit 27 which processes the measurement signals and which incorporates a clock. A recorder 28 is connected to the processing unit 27, which is preferably a computer. Of course, it is to be understood that the recorder and processing unit could be incorporated into one unit.

Figure 2:
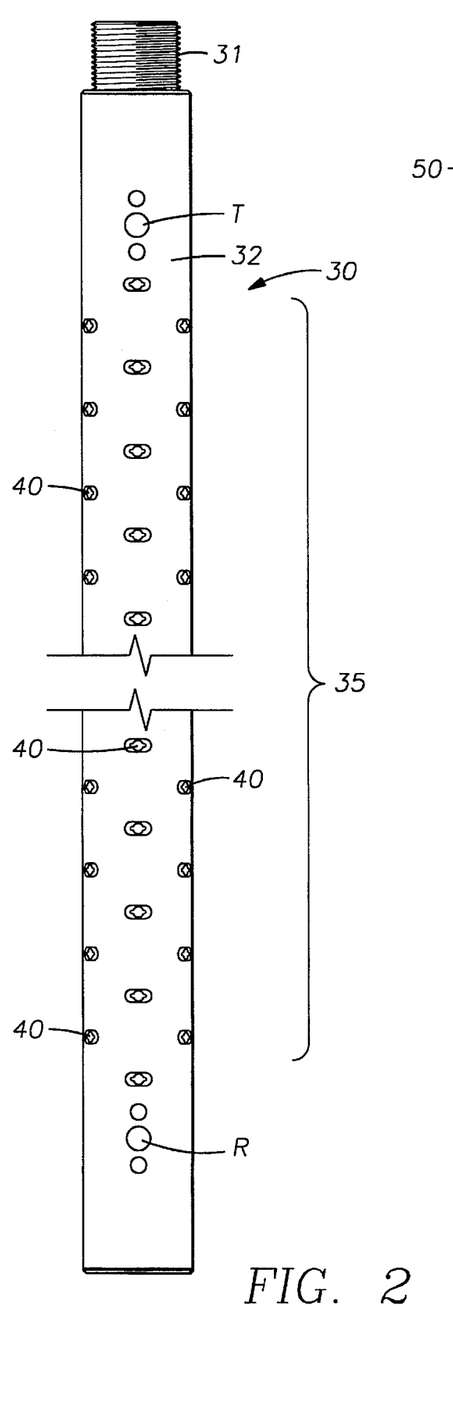
FIG. 2 is a side view of the present invention showing sonic tool 30, transmitter T, receiver R, and attenuation section 35.

Referring now to FIG. 2 there is shown one embodiment of sonic well tool 30 of the present invention, showing elongated body member 32 threaded connection 31 for attaching tool 30 to drill string 4, receiver R, transmitter T, and showing acoustical attenuation section 35 having acoustical attenuators 40.

While FIG. 2 shows acoustical attenuation section 35 between receiver R and transmitter T, it is to be understood that such an acoustical attenuation section 35 may also be positioned between transmitters or between receivers. Additionally, while sonic tool 30 is illustrated as having a receiver R and a transmitter T, it is to be understood that sonic tool 30 may comprise one or more transmitters and one or more receivers in any conceivable arrangement.

The number of and arrangement of attenuators 40 between receiver R and transmitter T will depend upon the type of attention desired. Best results are achieved if attenuators 40 are located to intercept all signal travel paths from transmitter T to receiver R.

Figure 3:
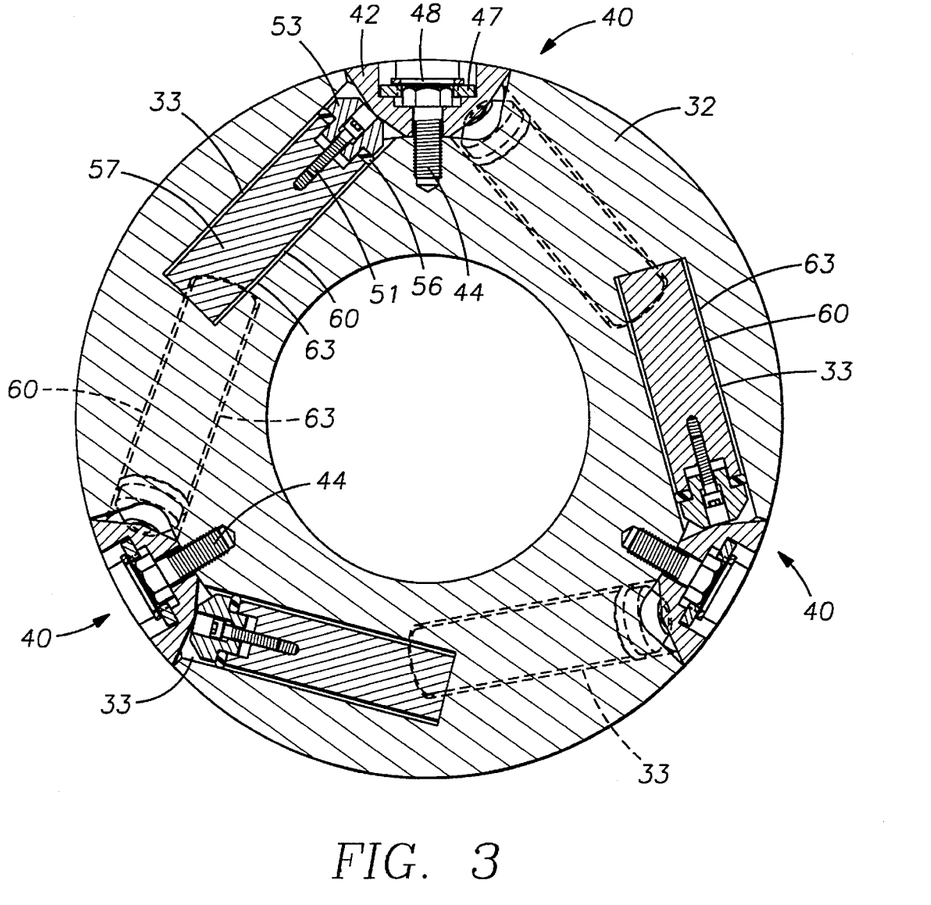
FIG. 3 is a cross-sectional view from attenuation section 35 from FIG. 2.
Figure 4:
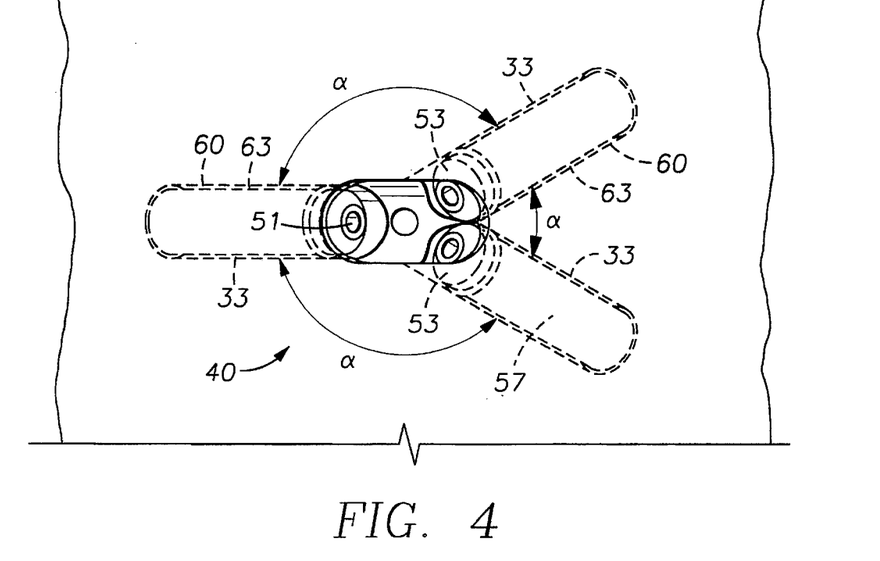
FIG. 4 is a top enlarged detailed view of the acoustical attenuator 40 from FIGS. 2 and 3.
Figure 5:
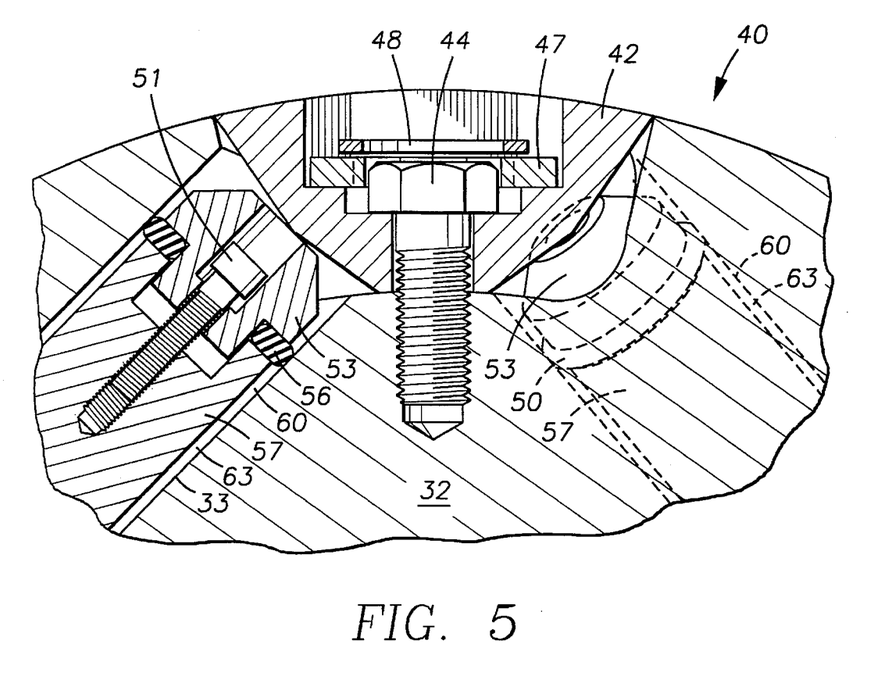
FIG. 5 is a side enlarged detailed view of the acoustical attenuator 40 from FIGS. 2 and 3.
Figure 6:
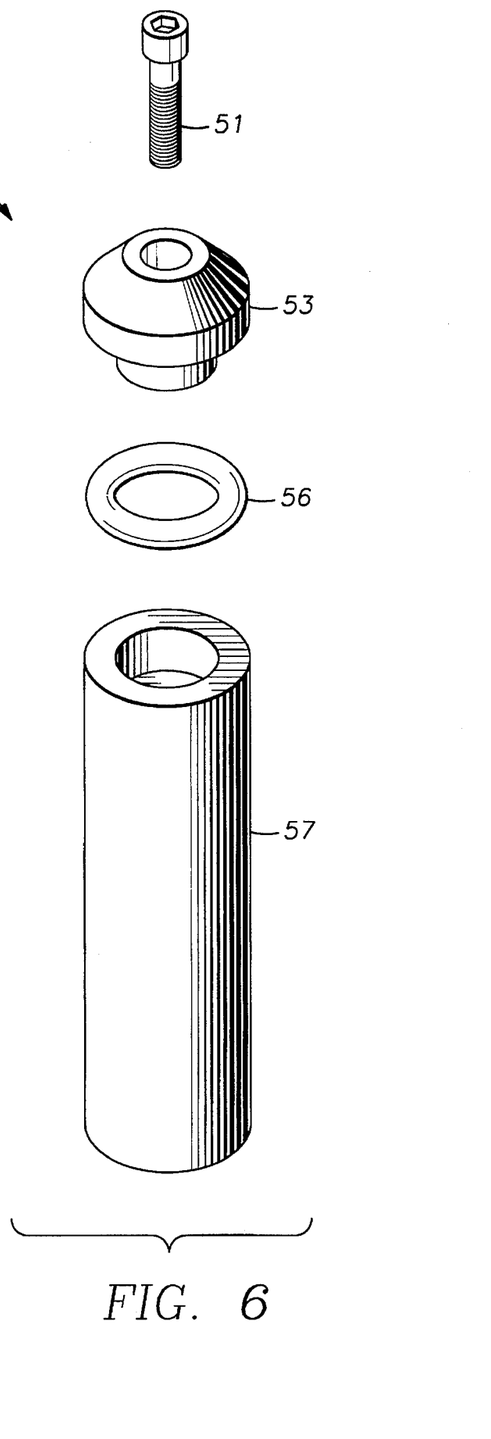
FIG. 6 is an exploded view of inertial mass finger assembly 50 showing inertial mass finger member 57, o-ring 56, finger cap 53 and bolt 51.

Referring now to FIGS. 3–6, acoustical attenuator 40 is discussed in more detail. FIG. 3 is a cross-sectional view from attenuation section 35 from FIG. 2. FIG. 4 is a top enlarged detailed view of the acoustical attenuator 40 from FIGS. 2 and 3. FIG. 5 is a side enlarged detailed view of the acoustical attenuator 40 from FIG. 3. FIG. 6 is an exploded view of inertial mass finger assembly 50.

As shown in FIGS. 3–6, inertial mass finger member 57 of acoustical attenuator 40 is inserted into and securely positioned in cavity 33 in sonic well tool 30. Acoustical attenuator 40 includes inertial mass finger assembly 50 and attenuator locking cap assembly 45. Acoustical attenuator 40 also includes acoustic attenuation fluid 63 which resides in gap 60 created between inertial mass finger assembly 50 and well tool body 32.

As shown in FIG. 3, each inertial mass finger 57 is oriented an angle α from the other two fingers 57. Each angle α will generally range from about 10° to about 200°. Preferably, each angle α will generally range from about 40° to about 170°. In the embodiment shown, angle α3 and α2 are each about 150° and angle α1 is about 60°.

As shown in FIG. 6, inertial mass finger assembly 50 includes inertial mass finger member 57, o-ring 56, inertial mass finger cap 53 and bolt 51. When assembled, o-ring member 56 is slightly compressed and will tend to protude slightly out from finger member 57. Thus, as shown in FIGS. 3 and 5, when finger assembly 50 is positioned within cavity 33 of tool body 32, o-ring member 56 will abut against the wall of cavity 33, forming a liquid barrier seal against the travel of fluid 63 from gap 60.

While the inertial mass member is shown in the illustrated embodiment as being a finger, it is to be understood that any suitable shape may be utilized as the inertial mass member, provided that a suitable controlled gap is maintained between the inertial mass member and the tool body in which attenuation fluid resides.

In fact, the inventors propose that inertial mass members that are shaped to circumscribe the tool, and members that are shaped elongated to run the length of the tool, be used in combination with illustrated fluid finger members.

Figure 7:
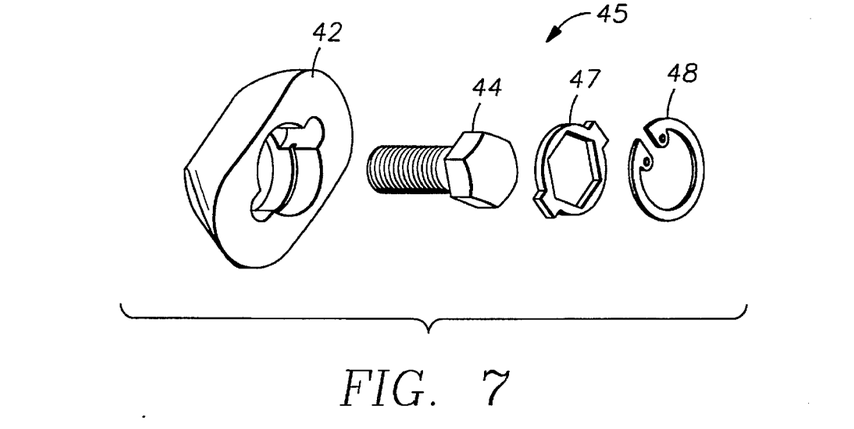
FIG. 7 is an exploded view of locking cap assembly 45, showing locking cap 42, bolt 44, bolt ring 47 and locking washer 48.

As shown in FIG. 7, locking cap assembly 45 includes locking cap 42, bolt 44, bolt ring 47 and locking washer 48. Locking cap assembly 45 serves to keep finger assemblies 50 positioned within cavities 33. In operation, locking cap 42 is positioned in cavity 33 and abuted against finger assemblies 50. Bolt 44 is then inserted and tightened. Bolt ring 47 is then positioned over bolt 44, with locking washer 48 utilized to keep bolt 44 locked in position. Inertial mass finger assembly 50 is then held positioned within cavity 33 such that there is a gap 60 between the walls of cavity 33 and inertial mass attenuator finger member 47.

The span of gap 60 is selected to provide the proper attenuation of sonic waves traversing the body of the well tool. The span of gap 60 will generally be in the range of about 0.0001 inches to about 0.25 inches. Preferably, the span of gap 60 will be in the range of about 0.001 inches to about 0.05 inches, and most preferably, the span of gap 60 will be in the range of about 0.005 to about 0.015 inches. It is to be understood that the gap width will vary according to the frequency of the sound being attenuated. Higher frequency sounds will require smaller gaps.

The inertial mass member 57 may be made of any suitable material that will tend to serve as an inertial mass which moves out of phase with the tool body. The suitable materials utilized as the inertial mass member will generally be higher specific gravity material. Generally the material utilized as the inertial mass member will have a specific gravity in the range of about 3 to about 22. Preferably, the inertial mass member will have a specific gravity of at least about 5. More preferably, the inertial mass member will have a specific gravity of at least about 7.

Other factors to consider in the selection of the material include machinability, thermal stability and economics.

Suitable materials include lead, steel, stainless steel, tungsten, platinum, bismuth, uranium, brass, copper, gold, silver, nickel, and any other high density materials. The preferable material to utilize in the present invention is stainless steel.

Acoustical attenuators 40 may generally be placed between a transmitter and receiver, between receivers, and between transmitters as desired, on the travel paths of the various acoustic or vibrational modes. Generally, acoustical attenuators are arranged in a pattern suitable to provide the desired attenuation. Care is usually taken to arrange acoustical attenuators 40 so that the acoustical attenuation section 35 is still structurally stronger that the threaded joint 31 at the end of the sonic tool.

Acoustical attenuation fluid 63 is selected to provide the proper attenuation to sonic waves traversing the acoustical attenuation section 35, and selected to provide a viscoelastic layer between the sonic tool 30 and the inertial mass member of acoustical attenuator 40. The acoustical attenuation fluid 63 must generally be able to withstand the well operating temperatures and pressures, and be of suitable viscosities at well conditions.

Suitable fluids for use as acoustical attention fluid 63 will generally have a low shear modulus, and will provide viscous energy dissipation.

Acoustical attenuation fluid 63 will generally have a viscosity in the range of about 0.1 centistokes to about 100,000 centistokes. Preferably, acoustical attenuation fluid 63 will have a viscosity in the range of about 1 to about 2000 centistokes, and most preferably in the range of about 10 to about 200 centistokes.

Suitable fluids for use as acoustical attenuation fluid 63 include temperature stabilized silicone oils, fluorocarbon lubricants, motor oils, drilling muds, polymers, expander polymers, and gels. Suitable fluid additives include clays and graphite powders. Preferably, acoustical attenuation fluid 63 is selected from among the temperature stabilized silicone oils.

Acoustical attenuation fluid 63 may also include additives to adjust thixotropic properties of the fluid.

The amount of attenuation required from acoustical attenuation section 35, will of course, depend upon various operating conditions and will tend to vary from operation to operation. In most cases, the sound to be attenuated will be in the range of about 2 to about 30 kHz.

EXAMPLES

The acoustical attenuator of the present invention dissipates energy by shearing the acoustical attenuation fluid. FIGS. 10A–D are schematic representations showing a tool body 505, an inertial mass 500, and an acoustical attenuation fluid 501, at various states.

Figure 10A:
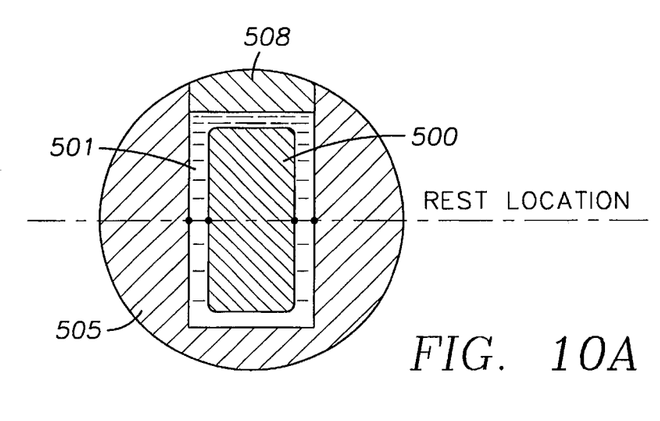

Specifically, FIG. 10A shows the inertial mass 500 at rest surrounded by acoustical attenuation fluid 501 confined by a tool 505 and locking cap 508.

Figure 10B:
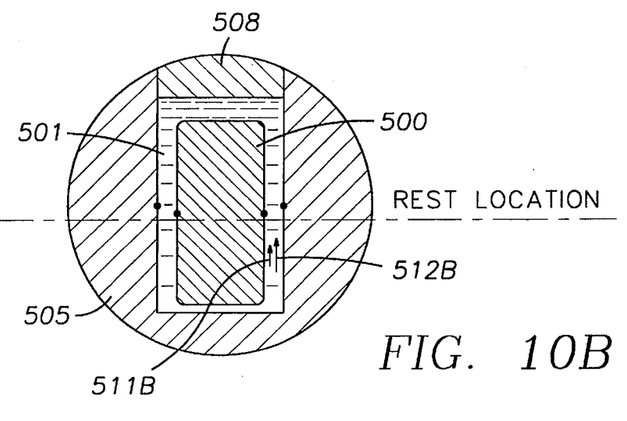

In FIG. 10B sound energy has moved the tool 505 upward but the inertial mass 500 lags because the viscous action of the fluid permits slippage, which slippage results in slower fluid motion 511B by the inertial mass 500 "than fluid motion 512B by" the tool 505.

Figure 10C:
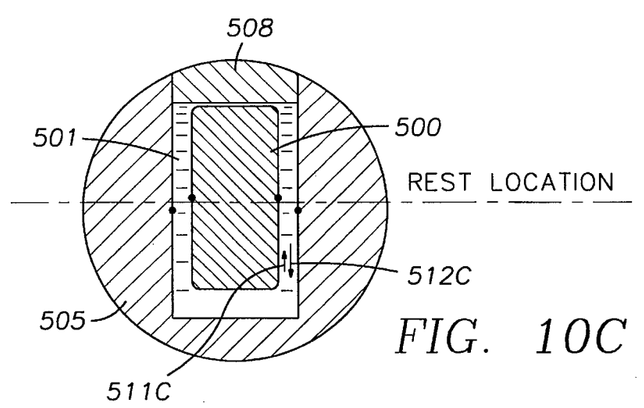

When sound drives the tool 505 downward in FIG. 10C, the inertial mass 500 can continue to slip upward while the tool 505 moves downward. This motion can shear the acoustical attenuation fluid upward 511C at the inertial mass 500 and downward 512C at the tool 505 wall.

Figure 10D:
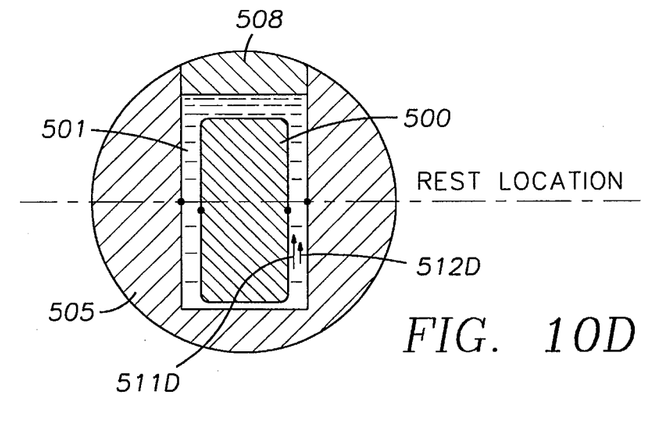

In FIG. 10D the tools 505 returns to rest after a sound excitation, but the inertial mass returns to rest later. The arrows 511D and 512D in FIG. 10D illustrate that the continuing motion of the inertial mass 500 creates a shear gradient in the gap between the mass 500 wall and the tool 505 wall. The shear gradients in FIGS. 10B, 10C, and 10D, dissipate energy as heat in the acoustical attenuation fluid 501.

A mathematical approximation to the fluid motion in the gap can be obtained using the Stokes oscillating plate and oscillating stream above a wall solutions. See, R. L. Panton, "Incompressible Flow", Wiley, New York, 1984 at pages 266 to 272, which entire book is herein incorporated by reference.

The greatest slippage for shearing the fluid occurs when the fluids at the inertial mass and the tool walls move out of phase.

Experimental results, and graphical solutions of the equations from Panton show that the gap size, the fluid viscosity and the oscillation frequency affect the shear dissipation in the acoustic attenuation fluid. For a given gap size and frequency, too high viscosity gives little fluid dissipation. If the inertial mass and tool materials have an impedance mismatch, this condition approximates the scattering losses described in E.P. No. 0 375 549 and no extra benefit is obtained from losses in the fluid. Experiments showed significant improvement with viscous layer damping, compared to impedance mismatch damping even if the inertial mass had the same acoustic impedance as the tool.

In contrast, too small viscosity also gives little fluid dissipation. Shearing forces for low viscosity are small and little transverse motion is transfered across the gap. Scattering losses are somewhat similar to those of fluid filled cavities. Experiments showed that a gap, inertial mass and optimum viscosity give greater attenuation than either the metal or fluid filled cavities.

Figure 11:
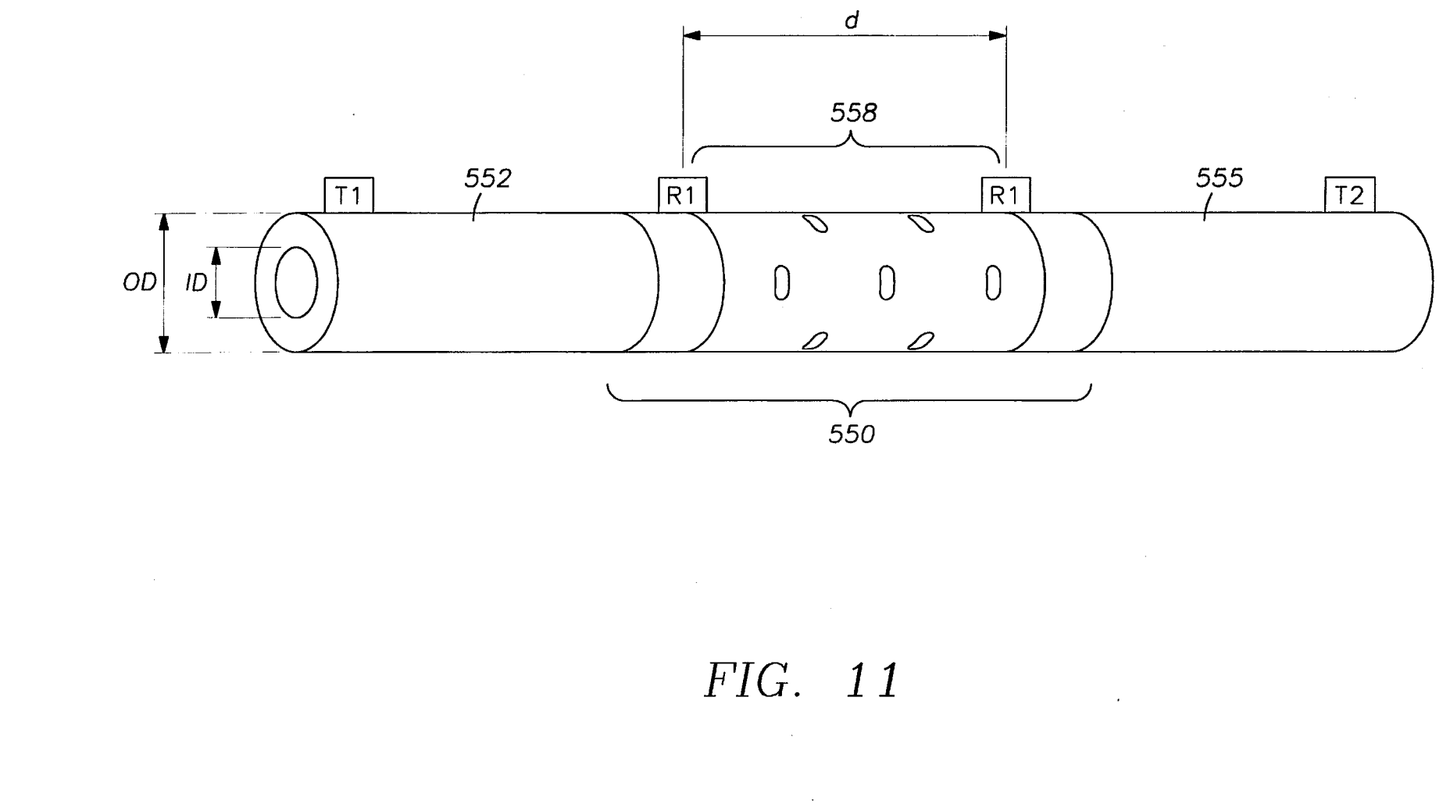
FIG. 11 shows the test configuration for the half-scale model utilized in the Example.

The test configuration for the half-scale models 550 is shown in FIG. 11. Various half-scale models 550 were securely fastened between the two half-scale solid transmitter sections 552 and 555. First transmitter $T_1$ was fired and signal $V_{11}$ observed at receiver $R_1$ and signal $V_{21}$ observed at receiver $R_2$. Then transmitter $T_2$ was fired and signal $V_{22}$ observed at receiver $R_2$ and signal $V_{12}$ received at receiver $R_1$. The attenuation A is given by the following equation 1:

$$A = 20/d * \log_{10} ((V_{11} * V_{22})/(V_{12} * V_{21}))^{0.5} \quad \text{(EQN. 1)}$$

wherein A is in dB per unit of length used to measure distance d, and d is the distance between $R_1$ and $R_2$ as shown in FIG. 11. The $V_{ij}$ values were taken as the amplitudes of the first half cycle arriving at the corresponding receiver. Alternatively, the maximum peak to peak values at the corresponding receivers were recorded as a cross check of the accuracy.

Figure 8:
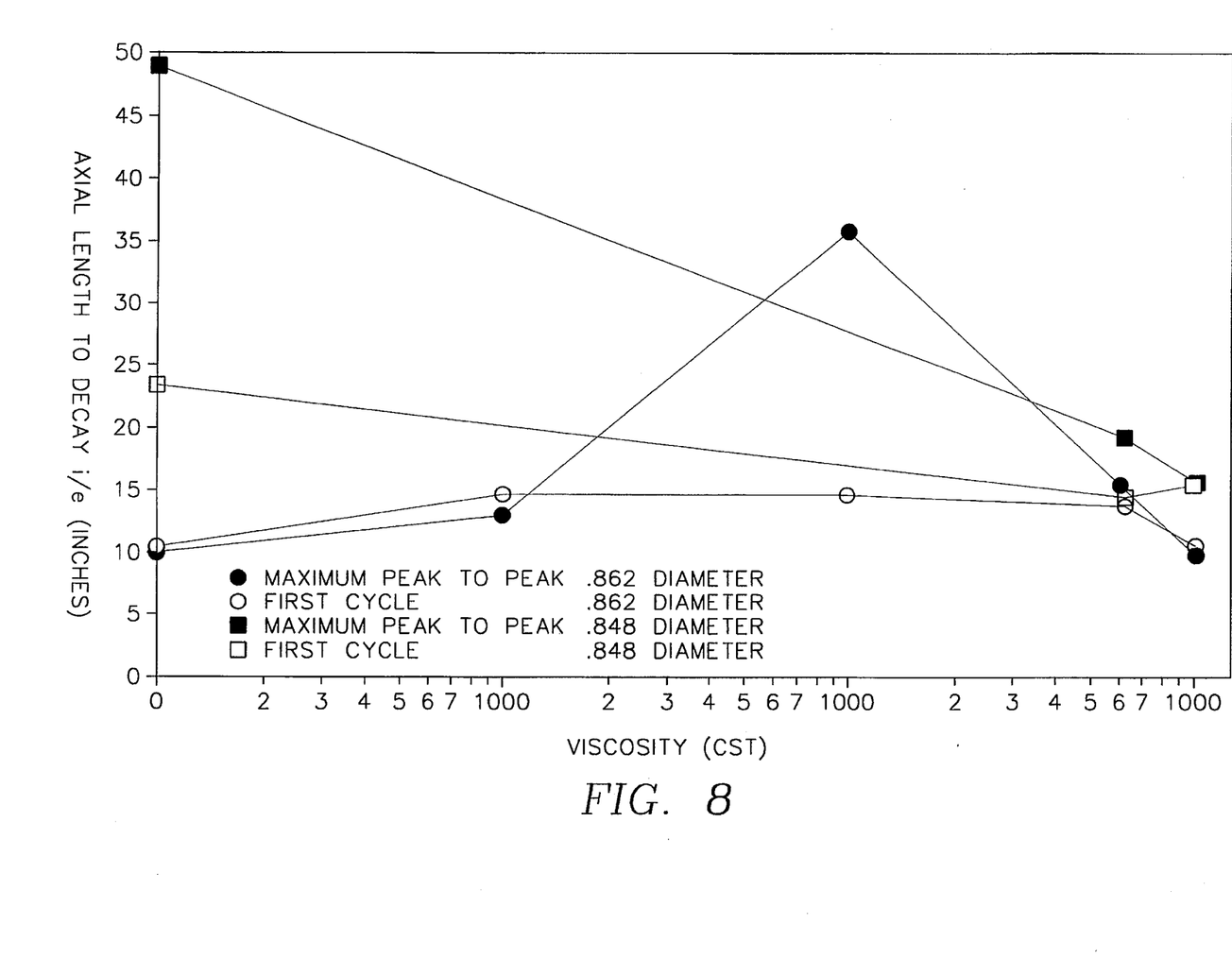
FIG. 8 is a graph showing the relationship between axial length to decay versus viscosity for scale model data.
Figure 9:
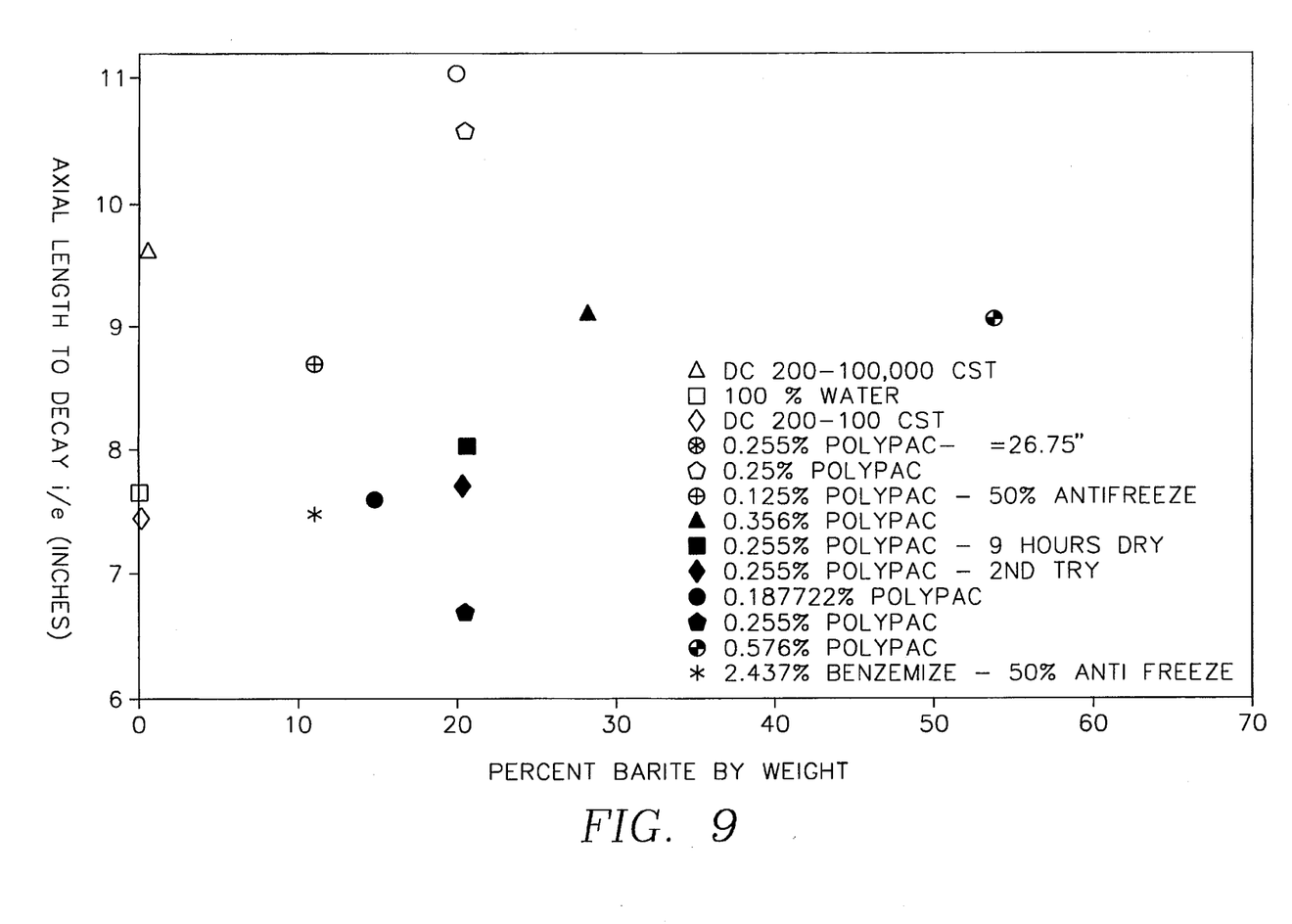
FIG. 9 is a graph showing the relationship between axial length to decay versus percent barite by weight for various fluids.

Results are shown in Table I and FIGS. 8 and 9.

The experiments were performed on half scale models which were approximately 3" O.D. and 1.5" I.D. and 15" long. The ends were secured to the half scale solid transmitter section using axial bolts which threaded into the half scale model ends. The receivers had a 12" separation. A variety of geometries 558 of attenuator holes were studied including: the embodiment attenuation shape of the present invention which is shown in FIGS. 3 and 4; a "swiss cheese" arrangement, i.e. holes with two openings to the O.D. (a chord through the annulus which did not penetrate to the bore); and the shapes shown in E.P. No. 0 375 549. These half scale models were tested with air, liquids, and solids in the attenuator cavities.

The transmitter transducers (piezoelectric PZT4) were naturally resonant at 250 KHz but were sufficiently broadband to be driven at 10 KHz to 20 KHz. The receiver transducers were resonant at 500 Khz and gave flat response for 10 KHz to 20 KHz.

Measurements for different viscosity fluids were made by removing the slugs, cleaning to remove the previous viscosity attenuator fluid, and reinstalling inertial members with the new fluid. Data were recorded by observing voltage amplitudes from the receivers on an oscilloscope. Observed voltages were processed by Equation 1 to obtain attenuation A. The distance for decay to 1/e was obtained by determining from A the distance for a decay of 8.69 dB.

TABLE I

The fluid type was DC-200 a silicone oil commercially available from The Dow Chemical Company; the frequency of noise was 10000 Hz.

| Viscosity (centistokes) | Gap Thickness (mils) | Nondimensional Thickness $Y = y/(nu/2*Pi*f)^2$ | In Phase Flow | | Quadrature Flow | |
|---|---|---|---|---|---|---|
| | | | Drive Plate | Drive Fluid | Drive Plate | Drive Fluid |
| 1 | 5 | 3.183418 | 0.1 | 0.1 | 0.05 | 1.1 |
| 10 | 5 | 1.006685 | 0.25 | 0.3 | 0.3 | 0.7 |
| 100 | 5 | 0.318342 | 0.15 | 0.2 | 0.7 | 0.25 |
| 1,000 | 5 | 0.100669 | 0.05 | 0.06 | 0.78 | 0.08 |
| 10,000 | 5 | 0.031834 | 0.01 | 0.02 | 0.8 | 0.03 |
| 100,000 | 5 | 0.010067 | 0.003 | 0.006 | 0.8 | 0.01 |
| 1 | 10 | 6.366836 | 0.01 | 0 | 0.01 | 1 |
| 10 | 10 | 2.01337 | 0.18 | 0.25 | 0.03 | 0.97 |
| 100 | 10 | 0.636684 | 0.22 | 0.3 | 0.5 | 0.55 |
| 1,000 | 10 | 0.201337 | 0.1 | 0.12 | 0.73 | 0.2 |
| 10,000 | 10 | 0.063668 | 0.03 | 0.04 | 0.78 | 0.06 |
| 100,000 | 10 | 0.020134 | 0.01 | 0.01 | 0.8 | 0.02 |

-continued

| Viscosity (centistokes) | Gap Thickness (mils) | Nondimensional Thickness Y = y/(nu/2*Pi*f)² | In Phase Flow | | Quadrature Flow | |
|---|---|---|---|---|---|---|
| | | | Drive Plate | Drive Fluid | Drive Plate | Drive Fluid |
| 1 | 15 | 9.550254 | 0.001 | 0 | 0.001 | 1 |
| 10 | 15 | 3.020055 | 0.1 | 0.12 | 0.05 | 1.1 |
| 100 | 15 | 0.955025 | 0.25 | 0.3 | 0.3 | 0.7 |
| 1,000 | 15 | 0.302006 | 0.15 | 0.2 | 0.7 | 0.25 |
| 10,000 | 15 | 0.095503 | 0.06 | 0.06 | 0.78 | 0.08 |
| 100,000 | 15 | 0.030201 | 0.02 | 0.02 | 0.8 | 0.03 |

The results consistently showed that merely cutting slots or firmly securing fillers in the slots gave smaller attenuation than using slots with inertial masses surrounded by an attenuation fluid in a gap of proper thickness for the frequency and fluid viscosity.

The results of the experiments with the different acoustical attenuation fluids in the gap of the half-scale models are shown in FIGS. 8 and 9.

FIG. 9 is a graph of the results for the reworked swiss cheese half-scale model. "Old Swiss" refers to the swiss chese half-scale model. "Reworked" refers to remachining of the cavities in the model to provide a higher tolerance of the gap width. Most of the fluids utilized contained various percentages of barite, a well fluid polymer called PolyPac, and water. In some instances, a 50–50 weight percentage mixture of water and antifreeze was substituted for the water. Bentonite and DOW Chemical DC-200 silicone oil (either 100,000 centistoke or 100 centistoke) was also utilized.

The abscissa in FIG. 9 showns the percentage barite clay in the fluid. Barite clays are added to drilling muds to give non-Newtonian properties which can dissipate more highly than viscoelatic materials such as silicone oils. The ordinate shows a measure of attenuation the axial distance for the signal to decay to 1/e of the starting amplitude. The highest point is the point at 16.015 which is off-scale, as is the second highest point. Notice that the best damping (shortest decay length) was obtained with 0.255% PolyPac additive in 20% barite at about 6.6. Unfortunately, the fluids with barite were thermally unstable and dehydrated with time. In the dehydration processes, attenuation improved until optimum viscosity was achieved. Further dehydration gave higher viscosity and the resultant smaller attenuation.

The DC-200 silicone oil results in FIG. 9 are shown on the ordinate of 0% barite. Notice that DC-200 of 100 cst provided shorter decay length than DC-200 of 100,000 cst. The gap size of 0.003" to 0.005" was designed for the lower viscosity fluid.

The interaction of gap size and viscosity are further studied in FIG. 8. Two different plug diameters are utilized in the Swiss Cheese model using dual compensation between the two receivers and the two transmitters. The abscissa gives the DC-200 silicone oil viscosity. The ordinate gives the decay length described above. In FIG. 8, the "first cycle" is the peak-to-peak measurement for the first cycle received by the receiver. The "maximum peak-to-peak" is the maximum for any cycle received by the receiver.

Notice that at small viscosities the small gaps (0.862" diameter inertial mass fingers) give the shortest distance for axial decay. The 0.848" diameter fingers have too large of a gap to adequately shear the fluid.

The higher viscosity fluids give shorter decay lengths for the large gap fingers. These gaps were not as tight as those in FIG. 9 which showed that the 100,000 cst silicone oils can give smaller damping than 100 cst oil. The 100 cst oil is a preferred material because of ease of handling and stability of viscosity under changing temperature and pressure over time.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled the art to which this invention pertains.

We claim:

1. An apparatus for performing acoustic investigations of subsurface geological formations penetrated by a borehole, comprising:
   (a) a longitudinally extending body for positioning in said borehole;
   (b) a transmitter supported by the body for transmitting acoustic energy;
   (c) a receiver supported by the body for receiving acoustic energy;
   (d) an acoustic attenuation section positioned on the body between the transmitter and the receiver comprising, at least one cavity defined by the body, an inertial mass member for each cavity, and an acoustical attenuation fluid, wherein the cavity is shaped to receive the inertial mass member such that a gap is formed between the inertial mass member and the tool body once the inertial mass member is positioned inside the cavity, and wherein the acoustical attenuation fluid is positioned within the gap.

2. The apparatus of claim 1 wherein the gap between the cavity and the inertial mass member is in the range of about 0.0001 to about 0.25 inches.

3. The apparatus of claim 1 wherein the enertial mass member comprises at least one selected from among lead, steel, stainless steel, tungsten, platinum, bismuth, uranium, brass, copper, gold, silver and nickel.

4. The apparatus of claim 1 wherein the inertial mass member comprises stainless steel.

5. The apparatus of claim 1 wherein the enertial mass member has a specific gravity of at least 7.

6. The apparatus of claim 1 wherein the attenuation fluid comprises at least one selected from among silicone oils stabilized for borehole temperature and pressure, fluorocarbon lubricants, motor oils, drilling muds, polymers, expander polymers, and gels.

7. The apparatus of claim 1 wherein the attenuation fluid comprises a silicone oil stabilized for borehole temperature and pressure.

8. The apparatus of claim 1 wherein the acoustic attenuation section further comprises an o-ring on the inertial mass member for sealing the fluid within the gap, and a locking cap assembly for securing inertial mass member within the cavity.

9. The apparatus of claim 1 wherein the viscosity of the fluid is in the range of about 0.1 to about 100,000 centistokes.

10. The apparatus of claim 1 wherein the acoustic attenuation section comprises three cavities, each oriented about 120° from the other two cavities.

11. The apparatus of claim 10 wherein the inertial mass member comprises stainless steel.

12. The apparatus of claim 11 wherein the attenuation fluid comprises a silicone oil having a stable viscosity with respect to borehole temperature and pressure.

13. An apparatus for attenuating sound waves travelling from a source to a receiver, the apparatus comprising:
   (a) a body;
   (b) at least one cavity defined by the body, an inertial mass member for each cavity, and an acoustical attenuation fluid, wherein the cavity is shaped to receive the inertial mass member such that a gap is formed between the body and the inertial mass member once the inertial mass member is positioned inside the cavity, and wherein the acoustical attenuation fluid is positioned within the gap.

14. The apparatus of claim 13 wherein the gap is in the range of about 0.001 to about 0.05 inches.

15. The apparatus of claim 13 wherein the enertial mass member comprises at least one selected from among lead, steel, stainless steel, tungsten, platinum, bismuth, uranium, brass, copper, gold, silver and nickel.

16. The apparatus of claim 13 wherein the inertial mass member comprises stainless steel.

17. The apparatus of claim 13 wherein the attenuation fluid comprises at least one selected from among silicone oils stabilized for borehole temperature and pressure, fluorocarbon lubricants, motor oils, drilling muds, polymers, expander polymers, and gels.

18. The apparatus of claim 13 wherein the attenuation fluid comprises a silicone oil.

19. The apparatus of claim 13 further comprising an o-ring on the inertial mass member for sealing the fluid within the gap, and a locking cap assembly for securing the inertial mass member within the cavity.

20. The apparatus of claim 13 wherein the viscosity of the fluid is in the range of about 0.1 to about 100,000 centipoise.

21. The apparatus of claim 13 wherein the body comprises three cavities, each oriented about 120° from the other two cavities.

22. The apparatus of claim 21 wherein the inertial mass member comprises stainless steel.

23. The apparatus of claim 22 wherein the attenuation fluid comprises a silicone oil having a stable viscosity with respect to borehole temperature and pressure.

24. A method for attenuating sonic waves travelling along a sonic well tool, wherein the sonic well tool comprises an longitudinally extending body, a transmitter supported on the body, a receiver supported on the body, and an attenuation section on the body, the method comprises
   (a) transmitting a sonic signal from the transmitter to the well tool body;
   (b) transmitting the sonic signal through the attenuation section on the well tool body to produce an attenuated signal, wherein the section comprises one or more cavities defined by the body, an inertial mass member positioned inside each cavity in a suitable manner to form a gap between the wall of the cavity and the inertial mass member, and an acoustical attenuation fluid in the gap;
   (c) receiving the attenuated signal at the receiver.

* * * * *